United States Patent [19] [11] 4,330,200

Kikuchi et al. [45] May 18, 1982

[54] COPYING MACHINE WITH COLLATING APPARATUS

[75] Inventors: Hideo Kikuchi; Tamaki Kaneko; Sunao Ikeda; Tugio Okuzawa; Yohtaro Kakitani; Kunio Hibi, all of Tokyo, Japan

[73] Assignee: Ricoh Company, Ltd., Tokyo, Japan

[21] Appl. No.: 190,105

[22] Filed: Sep. 24, 1980

[30] Foreign Application Priority Data

Apr. 15, 1980 [JP] Japan ............................... 55-049899

[51] Int. Cl.[3] ...................... G03B 27/42; B65H 39/07; B65H 39/11

[52] U.S. Cl. ................................ 355/24; 355/14 SH; 355/55; 271/288; 271/296

[58] Field of Search .................. 355/3 SH, 14 SH, 23, 355/24, 25, 55, 56; 271/288, 289, 290, 296

[56] References Cited

U.S. PATENT DOCUMENTS

| | | | |
|---|---|---|---|
| 3,830,590 | 8/1974 | Harris et al. | 355/14 SH |
| 4,078,787 | 3/1978 | Burlew et al. | 355/14 SH |
| 4,200,386 | 4/1980 | Queener | 355/3 SH |
| 4,285,508 | 8/1981 | Kaneko | 271/296 |

*Primary Examiner*—L. T. Hix
*Assistant Examiner*—Alan Mathews
*Attorney, Agent, or Firm*—David G. Alexander

[57] ABSTRACT

A copying machine equipped with a collator for distributing copy sheets fed thereto from a copying machine body into its multiple bins and, upon the lapse of a determined period of time after a copying operation, changing the operating mode from a collation mode or an assortment mode, which may have been selected in the use of the collator, automatically to a normal copying mode. The collator is provided with a bin sheet sensor adapted to detect sheets in the bins thereof. The copying machine is also provided with means for cancelling the automatic mode changing function when the bin sheet sensor detects a sheet or sheets, that is, when the bins of the collator are not entirely empty.

4 Claims, 4 Drawing Figures

COPYING MACHINE WITH COLLATING APPARATUS

BACKGROUND OF THE INVENTION

The present invention relates to a copying machine with a collating apparatus which receives copy sheets from a copying machine body and distributes them successively into a plurality of storage bins.

A copying machine with a collator is operable in three different modes: a normal copying mode wherein copy sheets prepared within a copying machine body are directed onto a discharge tray, a collation mode wherein a series of copies from the copying machine body are distributed one by one into individual bins of the collator, and a sorting or assortment mode wherein a series of copies are delivered continuously into a single bin and then the same number of copies into the next bin.

Some of known copying machines of the type described have a function of changing the operating mode from a collation mode or an assortment mode, if set up, automatically to a normal copying mode upon the lapse of a given period of time after the copying operation in the collation or assortment mode has completed. This automatic mode change is to prevent a person who will use the machine next from operating it in a collation or assortment mode against his will.

Usually, a person using such copying machine in a collation or assortment mode causes it to repeat a second series of copying cycles after first repeated cycles. During collation mode in particular, he will prepare copies of a first page, then copies of a second page, then copies of a third page and so on until desired number of pages and volumes of copies are obtained. Then he will take the copy stacks out from the bins of the collator. Operator's actions in an assortment mode are almost the same as those in the collation mode but for a case wherein the desired number of volumes of copies is only one, in which case copies needs only be discharged onto a tray by a normal copying mode of operation. In this respect, the "assortment mode" mentioned will be employed to prepare two or more volumes of copies of different documents.

It follows that, in the collation or assortment mode, presence of sheets in a bin or bins of the collator means in many cases that the work for collating or sorting a series of copies is still under way. Yet, with the copying machine having such automatic mode changing function, the collating or sorting mode automatically and necessarily changes into a normal copying mode if a determined time period expires from the instant the copying operation in the collation or assortment mode has completed to the instant the next copying operation is started. Should a person using the machine in a collation or assortment mode suspend its operation for some time for the change of documents, preparation etc., the operating mode would be replaced by a normal copying mode automatically against his will.

SUMMARY OF THE INVENTION

A copying machine including a collating apparatus comprises an automatic copying mode changing device for automatically changing a copying mode comprising at least one of a collation mode and a sorting or assortment mode during copying operation to a normal copying mode after a predetermined length of time upon completion of the copying operation, sheet sensor means provided in the collating apparatus for detecting presence of at least one copy sheet in any of bins of the collating apparatus and producing an output signal indicating the presence of the copy sheet in the bins, and control means operatively connected to the automatic copying mode changing device and the sheet sensor means to control the automatic copying mode changing device to be rendered inoperative in response to the output signal from the sheet sensor means until all of the copy sheets are removed from the bins.

In accordance with the present invention, in a copying machine equipped with a collator for distributing copy sheets fed thereto from a copying machine body into its multiple bins and, upon the lapse of a determined length of time after a copying operation, changing the copying mode from a collation mode or an assortment mode, which may have been selected in the use of the collator, automatically to a normal copying mode, there is provided a bin sheet sensor adapted to detect sheets in the bins of the collator and means for cancelling the automatic mode changing function when the bin sheet sensor detects a sheet or sheets, that is, when the bins of the collator are not entirely empty.

It is an object of the present invention to overcome a drawback inherent in a prior art copying machine with a collator having a function of changing the copying mode from a collation mode or an assortment mode, which may have employed for a first copying operation, automatically into a normal copying mode upon the lapse of a given time period after the first copying operation.

It is another object of the present invention to provide a copying machine with a collator having an automatic mode changing function and controllable such that, when the existing mode of operation is a collation mode or an assortment mode, this operating mode is prevented from being replaced automatically by a normal copying mode even after the lapse of a determined time period since the completion of the operation in the collation or assortment mode unless all of the copies are removed from the bins of the collator.

It is another object of the present invention to provide a generally improved copying machine having a collating apparatus.

Other objects, together with the foregoing, are attained in the embodiment described in the following description and illustrated in the accompanying drawing.

DESCRIPTION OF THE PREFERRED EMBODIMENT

While the copying machine with the collating apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
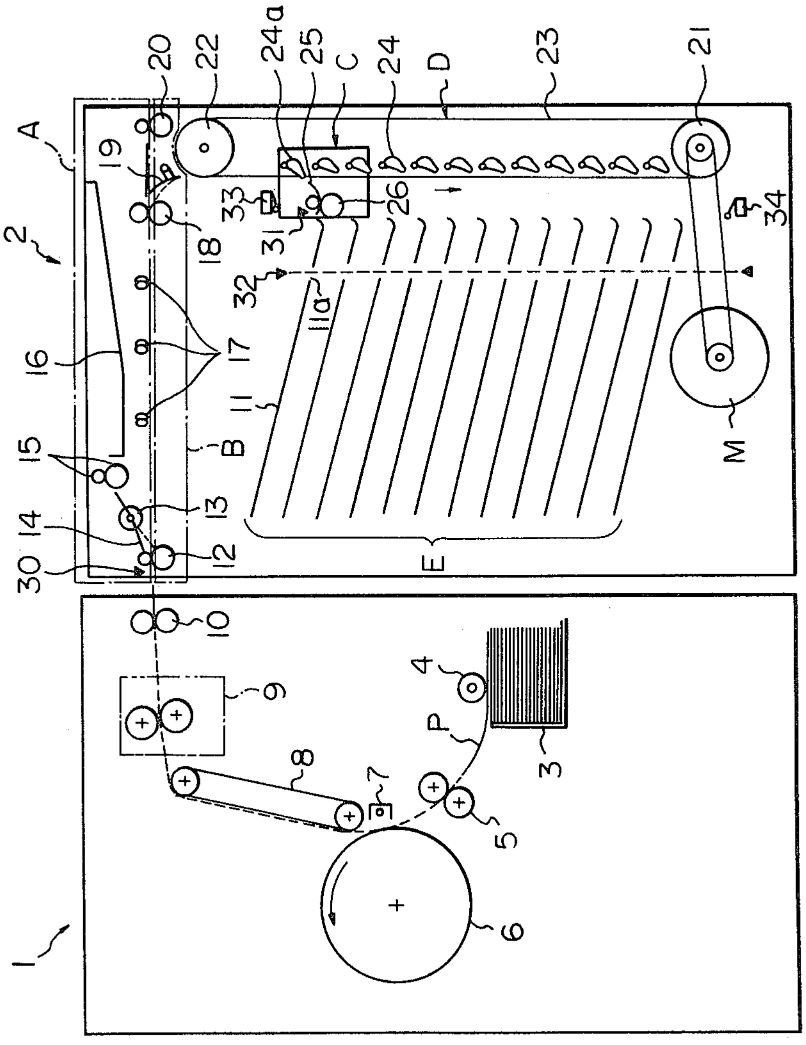
FIG. 1 schematically shows a copying machine with a collator according to the present invention.

Referring to FIG. 1, the copying machine with a collator according to the present invention is made up of a copying machine body 1 and a collator 2 connected therewith.

In the copying machine body 1, feed rollers 4 supply sheets P one by one from a sheet cassette or a tray 3 in a well known manner. Then registration rollers 5 advance a sheet P fed thereto from the feed rollers 4 to a determined transfer station in timed relation with the movement of a toner image carried on a rotating photosensitive drum. At the transfer station, a transfer charger 7 transfers the toner image from the drum 6 onto the sheet P reached the transfer station. Charging, exposing and developing stations usually arranged around the drum 6 are omitted in FIG. 1 for the sake of simplicity.

The copy sheet P now carrying the toner image is advanced by a conveyor belt 8 to a fixing unit 9 and, there, has the toner image fixed thereon. From the fixing unit 9, the copy sheet P is driven by discharge rollers 10 as indicated by an arrow out of the copying machine body 1 and into the collator 2 with its imaged surface faced upward.

The collator 2 includes a sheet aligning section A, a feeder section B located below the aligning section A, a vertically reciprocatable deflecting unit C adapted to deliver copy sheets into selected bins, a conveyor section D supporting the deflector unit C while conveying copy sheets fed thereto from the sheet aligning section A or feeder section B to the deflector unit C, an array of sheet storage bins E positioned one upon another, and a motor M.

A copy sheet P discharged from the copying machine body 1 is caught by a pair of inlet rollers 12 and driven thereby to an inlet guide plate 14 whose position is controlled by a solenoid 13. In a usual copying mode, the guide plate 14 will be positioned to direct the copy sheet to a discharge tray 16 via a pair of rollers 15. In a collation or assortment mode, the guide plate 14 will assume the other position for routing the sheet horizontally straight to skew rollers 17. These skew rollers 17 bias the copy sheet into abutment with a reference plate (not shown) whereby the position and orientation of the sheet are aligned with predetermined ones. A pair of intermediate rollers 18 move the properly positioned copy sheet to an intermediate guide plate 19 which also has two different positions. In a first position indicated by a solid line in the drawing, the guide plate 19 will direct the copy sheet to the deflector D while, in a second position indicated by a phantom line, passing the copy sheet to a second collator (not shown) by way of a pair of rollers 20.

The conveyor section D has a conveyor belt 23 passed over a drive roller 21 and a driven roller 22. The drive roller 21 is driven by the motor M through an electromagnetic clutch.

The deflector C includes a sprocket (not shown), a chain for elevation (not shown) running around the rollers 21 and 22 and a chain (not shown) for loweration. When the sprocket is locked to the elevating chain by a first solenoid, the deflector C will move upward. When the sprocket is locked to the lowering chain, by a second solenoid, the deflector C will move downward.

The conveyor belt 23 is formed with numerous apertures while a vacuum chamber (not shown) is disposed between the opposite vertical runs of the belt 23. A copy sheet P reached the conveyor section D via the intermediate guide 19 is thus sucked onto the working surface of the belt 23 and thereby delivered downward into the deflector C.

Cams 24 are arranged at spaced locations in correspondence with the individual bins 11 in the array E such that one of them corresponding to a bin where the deflector C is in a dwell protrudes beyond the belt 23 toward said bin. The copy sheet arrived at the deflector C is separated from the working surface of the belt 23 by the curved surface of a protruding cam 24a and passed along a guide plate 25 on the deflector C to a pair of discharge rollers 26. These rollers 26 then delivers the copy sheet into a bin 11 aligned with the specific cam 24a.

A sheet sensor 30 typified by a photosensor or a microswitch is located within the collator 2 adjacent to the copy sheet inlet. A similar sheet sensor 31 is carried on the deflector C adjacent to the sheet outlet.

Each of the bins 11 in the array E is formed with a slot 11a for sheet removal which is vertically aligned with slots 11a of the other bins. Two cooperating sheet sensing elements 32 oppose each other through the slots 11a of the bins 11 in positions one above the uppermost bin and the other below the lowermost bin. The sensor elements may comprise a light source and light receiving element or an ultrasonic oscillator and receiver.

The collator additionally has therein a home position sensor 33 which will turn on when the deflector C is in its position aligned with the top bin, and an end sensor 34 which will turn on as the deflector C stops in the position aligned with the bottom bin. These sensors 33 and 34 may commonly comprise microswitches.

Figure 2A:
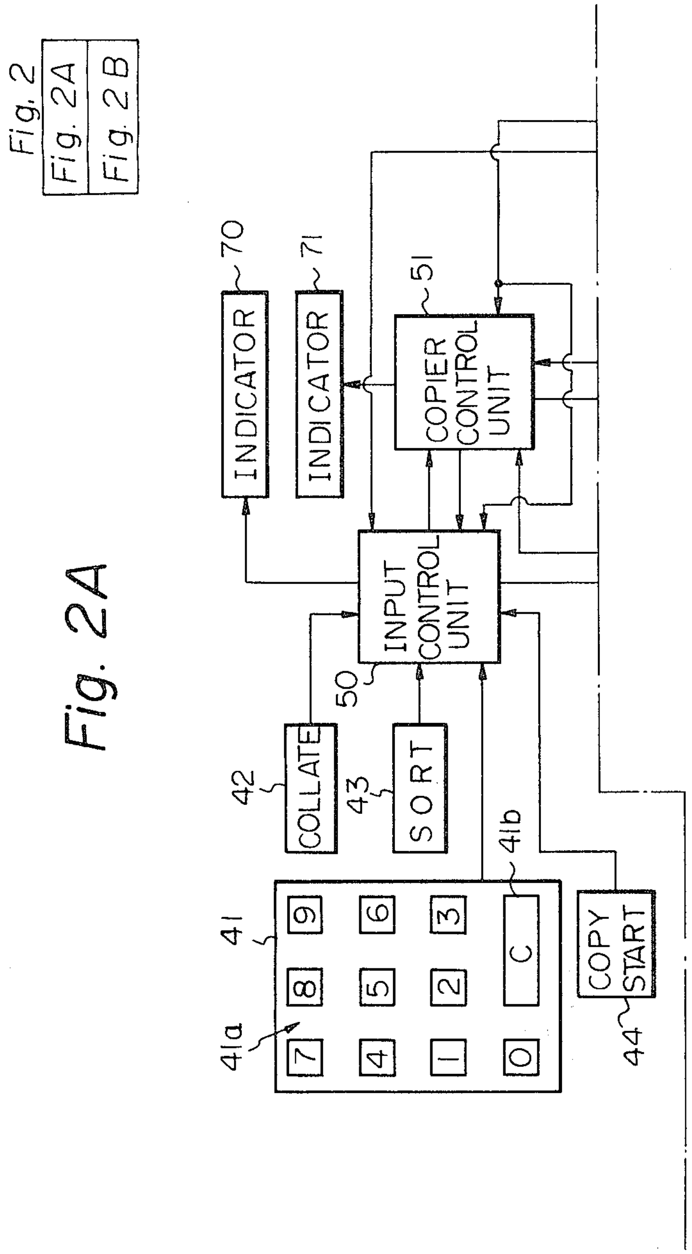
FIG. 2 shows in block diagram a control system associated with the copying machine.
Figure 2B:
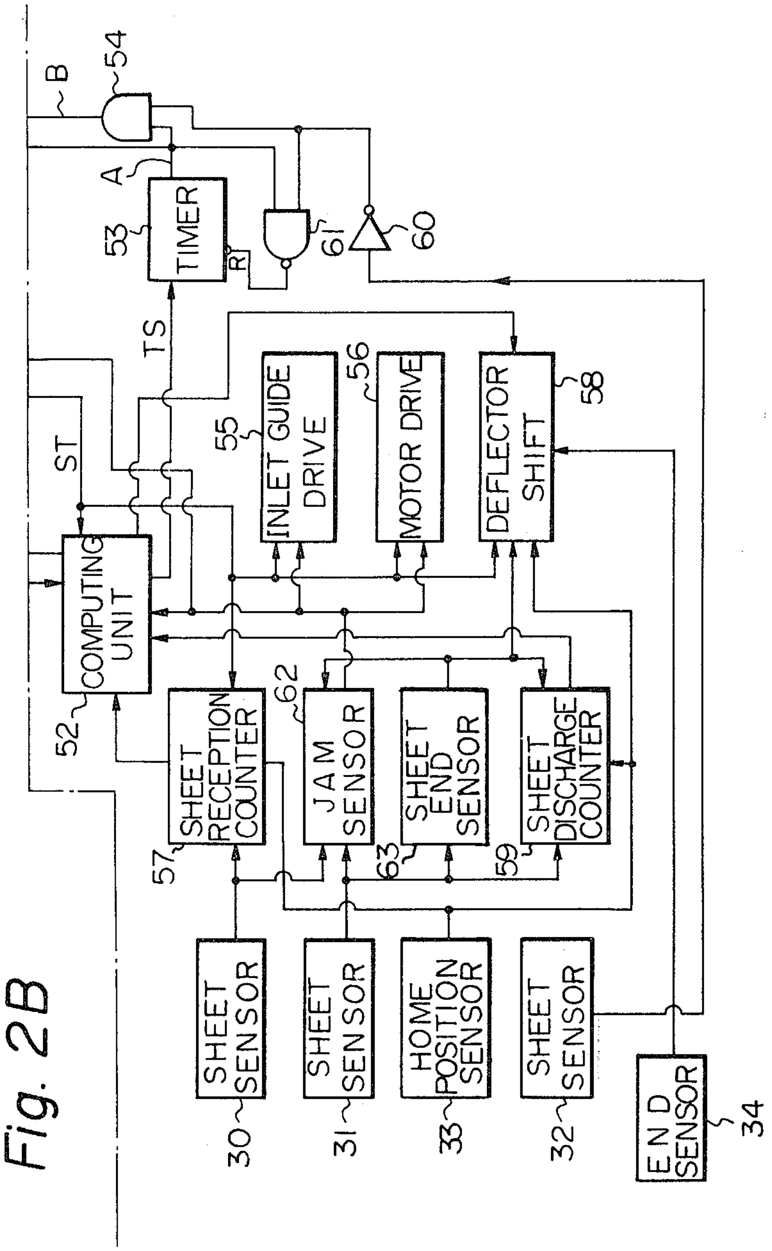

Referring to FIG. 2, there is shown in block diagram a control system for the copying machine of the present invention. The control system includes a ten key switch unit 41 having ten differnt keys 41a for selecting desired ones of numerals "0" to "9" and a clear key 41b for clearing selected numerals. This ten key switch unit 41 constitutes key switches for loading a desired number of copies. The system also includes a switch 42 for selecting a collation mode, a switch 43 for selecting an assortment mode and a copy start switch 44 for initiating a copying operation. These switches 42–44 are also in the form of key switches. The key switches 41a–44 are commonly carried on a control panel (not shown) mounted on the copying machine body 1.

Data introduced through any one of the key switches manipulated by an operator is coupled to a key input control circuit 50. The circuit 50 then identifies the function indicated by the input data on the basis of key input codes and timing codes and supplies its output signals to a copyier control circuit 51 and a computing circuit 52.

The circuit arrangement of the key input control 50 is such that, when the power source is turned on, it establishes a normal copying mode if a collation mode or assortment mode has not been selected. The key input control 50 is also constructed such that, when supplied with both of an output A of a timer circuit 53 and that B of an AND gate 54, it automatically selects a normal copying mode whether the operating mode may be an assortment mode or a collation mode and produces an output signal for setting a copy number "1". Furthermore, the key input control 50 has such a design that, where a collation mode or an assortment mode has been selected through the switch 42 or 43, it holds the selected operating mode as long as the output B of the AND gate 54 is absent even though the output A of the timer 53 may be present.

Figure 3:
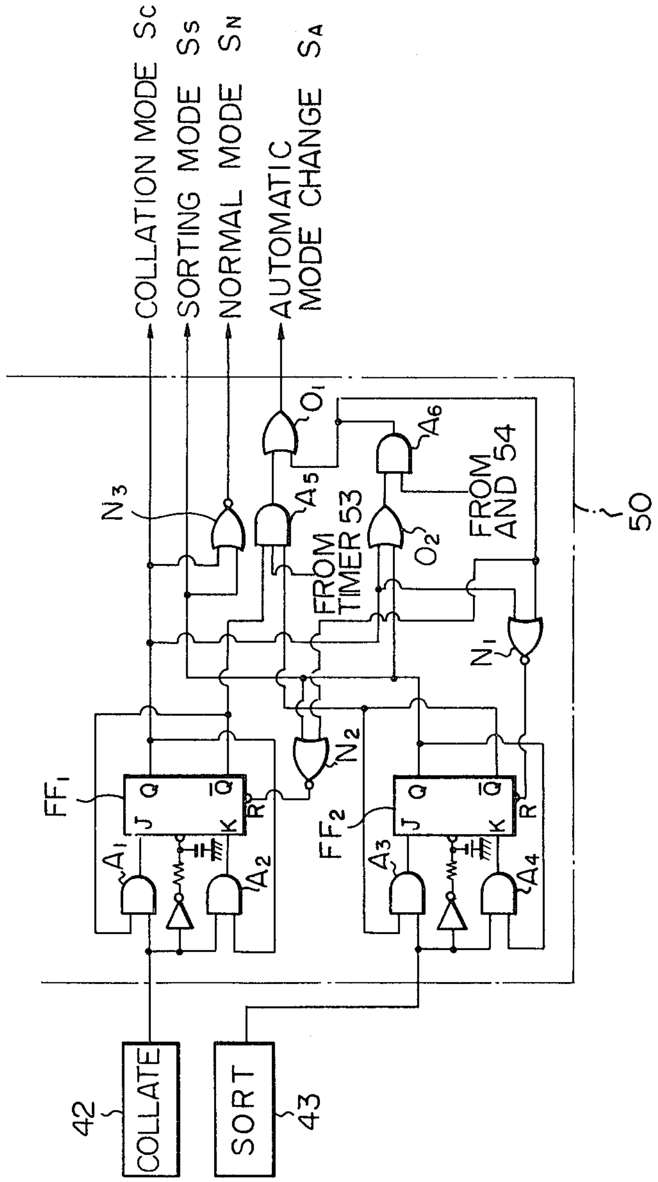
FIG. 3 is a diagram of part of a key input control circuit included in the system of FIG. 2 which is in charge of mode selection.

The key input control 50 has a section concerned with the mode selection designed as shown in FIG. 3.

When the collation switch 42 is depressed while a flip-flop $FF_1$ of the circuitry shown in FIG. 3 is producing "1" output at its output terminal $\overline{Q}$, an AND gate $A_1$ couples its "1" output to an input terminal J of the flip-flop $FF_1$. Then the flip-flop $FF_1$ is set and makes the output level at its terminal Q "1". A signal $S_C$ appearing at this time is a collation mode signal for establishing a collation mode. Another depression of the same collation switch 42 makes the output level of an AND gate $A_2$ "1" because the output level at the terminal Q of the flip-flop $FF_1$ is "1". The "1" output of the AND gate $A_2$ is applied to an input terminal K of the flip-flop $FF_1$ to reset it and thereby make the output Q "0" in level. In short, the flip-flop $FF_1$ is set or reset to establish or cancel the collation mode every time the collation switch 42 is depressed.

Likewise, a second flip-flop $FF_2$ will be set or reset through an AND gate $A_3$ or $A_4$ to establish or cancel the assortment mode each time the assortment switch 43 is depressed. When the signal level at an output terminal Q of the flip-flop $FF_2$ becomes "1", a signal $S_S$ will appear therefrom as an assortment mode signal for varying the operating mode into an assortment mode.

Further, when the flip-flop $FF_1$ is reset by the collation switch 42, its Q output level will become "1" to make the output level of a NOR gate $N_1$ "0" and thereby reset the flip-flop $FF_2$. Likewise, when the flip-flop $FF_2$ is set by the collation switch 43, its Q output will become "1" to make the output level of a NOR gate $N_2$ "0" and thereby reset the flip-flop $FF_1$.

Where the output levels at Q terminals of the flip-flops $FF_1$ and $FF_2$ are commonly "0", meanig that the collation mode signal $S_C$ and assortment mode signal $S_S$ are both absent, a NOR gate $N_3$ holds its "1" output and produces a normal mode signal $S_N$ for establishing a normal copying mode.

At this instant, the $\overline{Q}$ output levels of the flip-flop $FF_1$ and $FF_2$ are both "1" and, therefore, two inputs of an AND gate $A_5$ are both "1". When the signal A from the timer 53 of FIG. 2 which is the other input of the AND gate $A_5$ becomes "1", the output level of the AND gate $A_5$ turns from "0" to "1". Then an OR gate $O_1$ makes its output "1" and produces an automatic mode changing signal $S_A$ which establishes a normal copying mode and sets a copy number "1". However, since a normal copy mode has already been set up, what the signal $S_A$ coupled to the copier control 51 performs here is only making the copy number "1" if "2" or larger.

Where the operating mode selected is a collation mode or an assortment mode, the output level at Q terminal of the flip-flop $FF_1$ or $FF_2$ is "1". Accordingly, the signal level at either one of the input terminals of an OR gate $O_2$ is "1" which makes its output level "1". An AND gate $A_6$ thus holds "1" at one of its input terminals. Under this condition, when the output signal B of the AND gate 54 of FIG. 2 supplied to the other input terminal of the AND gate $A_6$ becomes "1", the AND gate $A_6$ makes its output level "1" and the OR gate $O_1$ delivers an automatic mode varying signal $S_A$. This causes the copier control 51 of FIG. 2 to vary the operating mode of the copying machine from the collation or assortment mode to a normal copying mode and set a copy number "1".

The "normal copying mode" referred to herein is naturally a usual copying mode different from collation and assortment modes and which stacks copy sheets on a discharge tray. Additionally, in the case of a copying machine capable of operating in special modes such as variable magnification mode and duplex copying mode, the normal copying mode should preferably be a mode in which all of such special modes have been cancelled.

It will be noted that, when the output level of the AND gate $A_6$ becomes "1", the NOR gates $N_1$ and $N_2$ commonly produce "0" outputs resetting the two flip-flop $FF_1$ and $FF_2$.

Turning back to FIG. 2, the copier control 51 governs the operation of the entire copying machine but will hereinafter be described concentrating on its actions relevant with the present invention.

When supplied with a normal mode signal $S_N$ from the key input control 50, the copier control 51 supplies signals to the computer 52 and an inlet guide drive circuit 55 and a motor drive circuit 56 associated with the collator 2, thereby carrying out the normal mode of operation. When the input of the copier control 51 is either a collation mode signal $S_C$ or an assortment mode signal $S_S$, the copier control 51 supplies a signal to a deflector shifting circuit 58 in addition to the circuit components mentioned above.

The data supplied from the key input control 50 to the computer 52 indicates a collation mode, the computer 52 will compare a reference number to be collated and the varying count of a sheet discharge counter 59 and, upon coincidence thereof, couple an elevation signal to the deflector shifting circuit 58. When a collation mode is indicated, the computer 52 will supply a low-operation signal to the circuit 58 when the count of the sheet discharger counter 59 coincides with a preset copy number. In a normal copying mode, the computer 52 will compare the count of a sheet reception counter 57 with a preset copy number and, upon coincidence, supply a motor stop signal to the motor drive 56. Furthermore, when the count of the sheet discharge counter 59 or that of the sheet reception counter 57 coincides with preset copy number data supplied from the key input control 50, the computer 52 will couple a timer start signal $T_S$ to the timer 53 determining that the copying operation has completed.

As a predetermined period of time expires after the supply of the timer start signal to the timer 53, the timer 53 passes its output to the AND gate 54 and key input control 50.

While the bin sheet sensor 32 in the collator 2 is producing a sheet detection signal or "1" output, an inverter 60 holds its output level at "0" and, accordingly, the output level of the AND gate 54 remains "0" even if the output of the timer 53 becomes "1" after the given period of time. This "0" output is coupled to the key input control 50 and copier control 51 as an automatic mode change inhibiting signal. Thus, an automatic change of the operating mode into a normal copying mode does not occur even though the determined time period may lapse after the completion of the copying operation.

The timer 53 is reset and re-started when the output level of a NAND gate 61 becomes "0". However, the supply of the timer start signal $T_S$ from the computer 52 to the timer 53 is interrupted when the copy start switch 44 is depressed to cause the copier control 51 to deliver a copy start signal $S_T$ through the key input control. The computer 52 also stops delivering the timer start signal $T_S$ when a new key input signal is coupled to the key input control.

Reference will also be made to FIG. 1 for describing the collator control section. The inlet guide drive 55 is adapted to actuate the solenoid 13 for the inlet guide 14 neighboring the copy sheet inlet of the collator 2. In a normal copying mode, the inlet guide drive 55 will position the guide 14 as indicated by a phantom line in FIG. 1 to discharge copy sheets reached the collator into the tray 16. The motor control 56 energizes or deenergizes the motor M associated with the collator depending on the output signals of the copier control 51 and a jam detection circuit 62. The deflector shifting circuit 58 serves to control the elevating and lowering solenoids associated with the deflector C. In a collation mode, the circuit 58 will lower the deflector C down to the next bin in response to an output signal of a sheet trailing end sensor circuit 63 while, in an assortment mode, it will lower the deflector down to the next bin in response to an output signal of the computer 52 which appears upon coincidence of the count of the sheet discharge counter 59 with the preset copy number. The sheet reception counter 57 counts copy sheets received by the collator in response to each output signal of the sheet sensor 30. The sheet trailing end sensor circuit 63 picks up a trailing-end-of-sheet signal as a pulse from the logical product of a sheet detection output of the sheet sensor 31 on the deflector and a signal which is a slightly delayed and inverted version of the output of the sheet sensor 31.

The circuitry of FIG. 2 further includes a first display for indicating a preset number of copies and a second display for showing the number of copies prepared by the machine.

Figure 4:
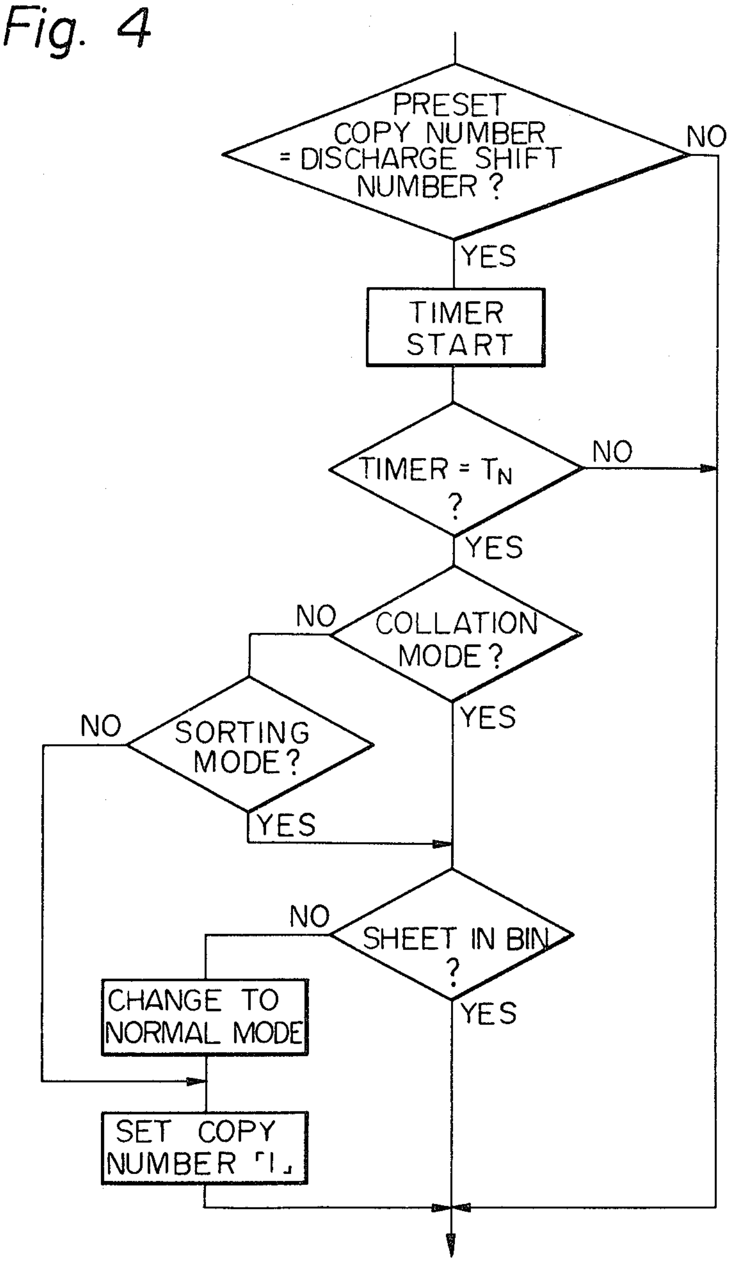
FIG. 4 is a flow chart demonstrating an automatic mode changing function according to the present invention.

FIG. 4 is a flow chart demonstrating the automatic mode changing function in accordance with the present invention. As shown, when a copying operation is started and the number of discharged sheets coincides with a preset copy number after a series of copying cycles, a predetermined timer program begins. As the timer operating time reaches a determined time $T_N$, it is determined whether the existing mode of operation is a collation mode or an assortment mode. If the operating mode is neither the collation mode nor the assortment mode, the copy number is made "1" and the usual copier control flow is regained. If in the collation mode or the assortment mode, whether any one of the bins is loaded with copy sheets is determined. If so, the system returns to the copier control flow and, if not, the system establishes a normal copying mode while setting a copy number "1".

In summary, it will be seen that the present invention provides an improved copying machine with a collator which is prevented from automatically changing its operating mode to a normal copying mode even if a collating or sorting mode of operation of the machine is suspended for a while for one reason or another. This is because, when the existing operation mode is a collation mode or an assortment mode, the copying machine does not automatically set up the normal copying mode as long as even a single copy sheet is found on any storage bin. If all the bins are empty, the operating mode of the machine will automatically change into the usual copying mode upon the lapse of a given time period after the completion of a copying operation so as to prevent the next operator from accidentally using the machine in a collation or assortment mode.

Various other modifications will become possible for those skilled in the art after receiving the teachings of the present disclosure without departing from the scope thereof.

What is claimed is:

1. A copying machine including a collating apparatus provided with an automatic copying mode changing device for automatically changing a copying mode comprising at least one of a collation mode and a sorting or assortment mode during copying operation to a normal copying mode after a predetermined length of time upon completion of the copying operation, comprising:

sheet sensor means provided in the collating apparatus for detecting presence of at least one copy sheet in any of bins of the collating apparatus and producing an output signal indicating the presence of the copy sheet in the bin; and control means operatively connected to the automatic copying mode changing device and the sheet sensor means to control the automatic copying mode changing device to be rendered inoperative in response to the output signal from the sheet sensor means until all of the copy sheets are removed from the bins.

2. A copying machine as claimed in claim 1, in which said copying mode further comprises a duplex copying mode in which images are reproduced on both sides of the copy sheets and a variable magnification mode in which an imaging operation is effected at various magnifications.

3. A copying machine as claimed in claim 1, in which the automatic copying mode changing device comprises timer means responsive to the completion of the copying operation to produce an output signal after the predetermined length of time, said control means further comprising inhibiting means for preventing the output signal from the timer means from being fed to the automatic copying mode changing device to thereby render the device inoperative.

4. A copying machine as claimed in claim 3, in which said inhibiting means comprises inverter means connected to the sheet sensor means to produce an output signal indicating absence of the copy sheets in the bins when the output signal from the sheet sensor means disappears, and AND gate means having an input connected to the timer means and another input connected to the inverter means and responsive to both the outputs from the timer means and inverter means to produce an output signal for rendering the automatic copying mode changing device operative.

* * * * *